(12) United States Patent
Akiyama (10) Patent No.: US 9,663,398 B2
(45) Date of Patent: May 30, 2017

(54) PHOTOCHROMIC SUBSTANCE AND METHOD FOR PRODUCING SAME

(71) Applicant: NATIONAL INSTITUTE OF ADVANCED INDUSTRIAL SCIENCE AND TECHNOLOGY, Tokyo (JP)

(72) Inventor: Morito Akiyama, Saga (JP)

(73) Assignee: NATIONAL INSTITUTE OF ADVANCED INDUSTRIAL SCIENCE, Tokyo (JP)

( * ) Notice: Subject to any disclaimer, the term of this patent is extended or adjusted under 35 U.S.C. 154(b) by 316 days.

(21) Appl. No.: 14/368,389

(22) PCT Filed: Nov. 1, 2012

(86) PCT No.: PCT/JP2012/078375
§ 371 (c)(1),
(2) Date: Jun. 24, 2014

(87) PCT Pub. No.: WO2013/099437
PCT Pub. Date: Jul. 4, 2013

(65) Prior Publication Data
US 2014/0326932 A1 Nov. 6, 2014

(30) Foreign Application Priority Data

Dec. 26, 2011 (JP) .................. 2011-284065

(51) Int. Cl.
| | | |
|---|---|---|
| C03C 4/02 | (2006.01) | |
| C03C 14/00 | (2006.01) | |
| G03C 1/725 | (2006.01) | |
| C09K 11/60 | (2006.01) | |
| C09K 11/62 | (2006.01) | |
| C09K 11/64 | (2006.01) | |
| C09K 11/66 | (2006.01) | |
| C09K 11/67 | (2006.01) | |
| C09K 11/68 | (2006.01) | |
| C09K 11/69 | (2006.01) | |
| C09K 11/70 | (2006.01) | |
| C09K 11/74 | (2006.01) | |
| C09K 11/75 | (2006.01) | |
| C09K 11/77 | (2006.01) | |

(52) U.S. Cl.
CPC .............. *C03C 14/008* (2013.01); *C03C 4/02* (2013.01); *C09K 11/602* (2013.01); *C09K 11/625* (2013.01); *C09K 11/646* (2013.01); *C09K 11/666* (2013.01); *C09K 11/676* (2013.01); *C09K 11/685* (2013.01); *C09K 11/698* (2013.01); *C09K 11/706* (2013.01); *C09K 11/7442* (2013.01); *C09K 11/757* (2013.01); *C09K 11/7734* (2013.01); *C09K 11/7774* (2013.01); *G03C 1/725* (2013.01); *C03C 2204/00* (2013.01); *C03C 2214/08* (2013.01); *C03C 2214/17* (2013.01)

(58) Field of Classification Search
USPC ........................................................ 252/586
See application file for complete search history.

(56) References Cited

FOREIGN PATENT DOCUMENTS

| JP | 2001-303033 | 10/2001 |
|---|---|---|
| JP | 2011-132493 | * 7/2011 |

OTHER PUBLICATIONS

Akiyama, Morito, "Blue-green light photochromism in europium doped BaMgSiO4," Applied Physics Letters 97, 181905 (2010).
Akiyama, Morito, "Multi color density photochromism in reduced tridymite BaMgSiO4 by wavelength of irradiation light," Journal of the Ceramic Society of Japan, vol. 119, No. 1386, Feb. 2011, pp. 1-5.
International Preliminary Report on Patentability of PCT/JP2012/078375, Jul. 10, 2014.
International Search Report of PCT/JP2012/078375, Jan. 29, 2013.
Akiyama, Morito, "Photochromism enhancement in reduced tridymite BaMgSiO4 by Fe-doping," Journal of Ceramic Society of Japan, vol. 119, No. 1389, May 1, 2011, pp. 338-341.

* cited by examiner

Primary Examiner — Monique Peets
(74) Attorney, Agent, or Firm — Casimir Jones, SC (57) ABSTRACT

Provided is a photochromic substance that has lower toxicity, exhibits good sensitivity in a visible light region, changes color deeply, has slow speed of color fading, has chemical and thermal stability, and has good durability. The photochromic substance has a composition represented by the formula:

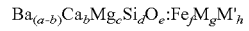

$Ba_{(a-b)}Ca_bMg_cSi_dO_e:Fe_fM_gM'_h$ where $1.8 \leq a \leq 2.2$, $0 \leq b \leq 0.1$, $1.4 \leq c \leq 3.5$, $1.8 \leq d \leq 2.2$, $e=(a+c+2d)$, $0.0001 \leq f$, $0.0001 \leq g$, $0 \leq h$, M is at least one of Al and Eu, and M' is at least one element selected from the group consisting of Na, K, Nd, Li, S, C, Ti, V, Mn, Cr, Cu, Ni, Co, Ge, Zn, Ga, Zr, Y, Nb, In, Ag, Mo, Sn, Sb, Bi, Ta, W, La, Ce, Pr, Nd, Sm, Gd, Er, Ho, Tb, Tm, Yb, Lu, P, Cd, and Pb.

6 Claims, 2 Drawing Sheets

PHOTOCHROMIC SUBSTANCE AND METHOD FOR PRODUCING SAME

CROSS REFERENCE TO RELATED APPLICATIONS

The present application is a Section 371 U.S. national stage entry of pending International Patent Application No. PCT/JP2012/078375, International Filing Date Nov. 1, 2012, which published on Jul. 4, 2013 as Publication No. WO 2013/099437A1, which claims the benefit of Japanese Patent Application No. 2011-284065, filed Dec. 26, 2011, the contents of which are incorporated by reference in their entireties.

TECHNICAL FIELD

The present invention relates to a photochromic substance and a method for producing the photochromic substance. More specifically, the present invention relates to (i) a photochromic substance that has lower toxicity, exhibits good sensitivity in a visible light region, changes color deeply (has lower reflectance), has a slow speed of color fading (has a high capacity of retaining the color change), has chemical and thermal stability, and has good durability, and (ii) a method for producing the photochromic substance.

BACKGROUND ART

A substance that exhibits photochromism is expected to be applied to various industrial products such as an optical disc (ultrahigh-density memory), an optical switch, optical printing ink, a display, sunglasses, and light control glass. As used herein, the photochromism refers to a property of exhibiting a kind of a reversible phenomenon, i.e., a property of undergoing a color change from an original color upon application of light but undergoing color fading to return to the original color upon application of another type of light or application of heat. A substance that exhibits such a property is referred to as a photochromic substance.

As the photochromic substance, both a photochromic substance made of an organic substance and a photochromic substance made of an inorganic substance are known. Known examples of the photochromic substance made of an organic substance encompass azobenzene, spiropyran, and diarylethene. However, the photochromic substance made of an organic substance has problems such as a low stability against heat and liability to undergo a chemical degradation due to repeated isomerization.

Therefore, a photochromic substance made of an inorganic substance, which has chemical and thermal stability, is attracting attention. Known examples of the photochromic substance made of an inorganic substance encompass molybdenum oxide, tungsten oxide, niobium oxide, titanium oxide, a mixture of these oxides, and glass in which a silver halide is included. However, these substances essentially exhibit sensitivity only in an ultraviolet light region which is harmful to human bodies. Moreover, there are only a small variety of commercially available small light source emitting ultraviolet light. Use of these substances therefore undesirably limits the field of application.

In view of the circumstances, recent years have witnessed an increase of research on photochromic substances which allow use of a small semiconductor laser, LED, or the like as a light source, especially photochromic substances each of which is made of an inorganic substance and which exhibits sensitivity in a visible light region so as to enable development of, for example, a small optical disc (ultrahigh-density memory).

For example, Patent Literature 1 describes a photochromic substance, made of divanadium pentoxide, which exhibits photochromism upon application of visible light. However, the photochromic substance described in Patent Literature 1, i.e., a conventional photochromic substance made of an inorganic substance has problems of insufficient durability and slow response speed. Moreover, this photochromic substance has a problem of poor reversibility because it can no longer return to its original color after several irradiations of light. Furthermore, there is another problem of strong toxicity of divanadium pentoxide.

In view of this, Patent Literature 2 proposes a photochromic substance that can be produced by preparing barium magnesium silicate in a reductive atmosphere and that exhibits good sensitivity in a visible light region. Patent Literature 2 also describes that photochromism can be improved by adding a specific metal element to barium magnesium silicate.

Figure 3:
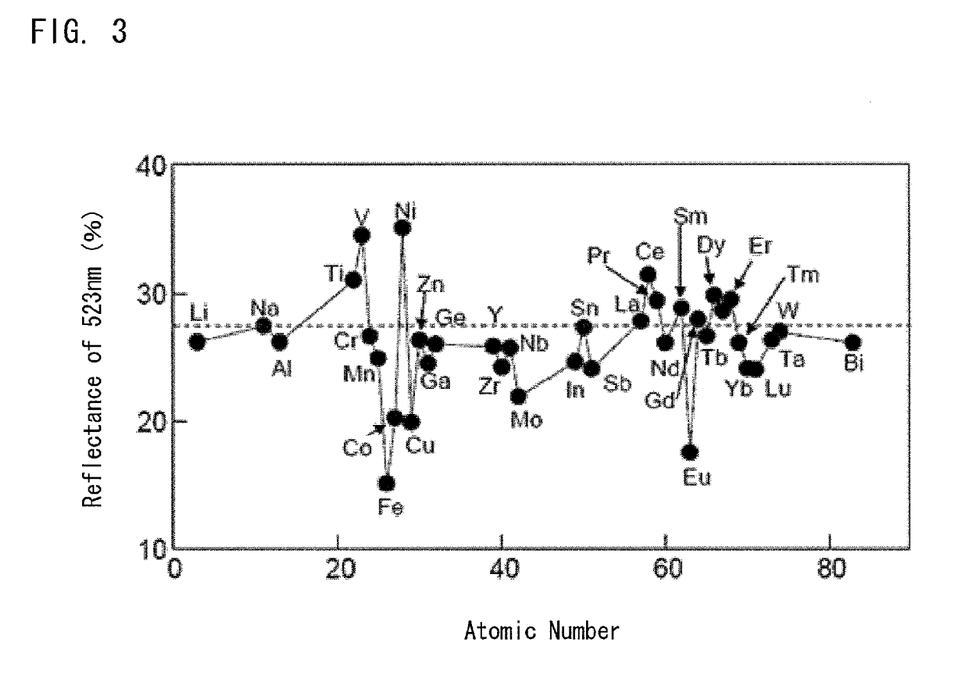
FIG. 3 is a graph, concerning a conventional photochromic substance, showing, for each metal element added to barium magnesium silicate, reflectance of light having a wavelength of 523 nm from the metal element-added barium magnesium silicate after irradiation of light having a wavelength of 365 nm (reflectance obtained by changing M" in $Ba_2Mg_{2.5}Si_2O_{8.25}$: $M''_{0.001}$).

FIG. 3 is a graph showing, for each metal element added to barium magnesium silicate, reflectance of light having a wavelength of 523 nm from the metal element-added barium magnesium silicate after irradiation of light having a wavelength of 365 nm (reflectance obtained by changing M" in $Ba_2Mg_{2.5}Si_2O_{8.25}$: $M''_{0.001}$). As is clear from FIG. 3, barium magnesium silicate is lowered in reflectance and exhibits a high photochromic property as a result of addition of especially iron (Fe) or europium (Eu). Since iron (Fe) is easily available unlike rare earthes such as europium (Eu), use of iron (Fe) makes it possible to cut down a production cost of a photochromic substance.

CITATION LIST

Patent Literature 1

Japanese Patent Application Publication, Tokukai, No. 2001-303033 A (Publication Date: Oct. 31, 2001)

Patent Literature 2

Japanese Patent Application Publication, Tokukai, No. 2011-132493 A (Publication Date: Jul. 7, 2011)

SUMMARY OF INVENTION

Technical Problem

However, the photochromic substance described in Patent Literature 2 has problems of changing color lightly (high reflectance), fast speed of color fading, and insufficient durability although it exhibits good sensitivity in a visible light region. Therefore, there are demands for a photochromic substance that has lower toxicity, exhibits good sensitivity in a visible light region, changes color deeply (has lower reflectance), has a slow speed of color fading (has a high capacity of retaining the color change), has chemical and thermal stability, and has good durability.

The present invention was accomplished in view of the above problems, and an object of the present invention is to provide (i) a photochromic substance that has lower toxicity, exhibits good sensitivity in a visible light region, changes color deeply (has lower reflectance), has a slow speed of color fading (has a high capacity of retaining the color change), has chemical and thermal stability, and has good durability and (ii) a method for producing the photochromic substance.

Solution to Problem

As a result of diligent studies for attaining the above object, the inventors of the present invention found that a photochromism property of a barium magnesium silicate can be further improved by adding aluminum (Al) and/or europium (Eu) to the barium magnesium silicate in addition to iron (Fe), which has been acknowledged to have an effect of improving a photochromism property. That is, the inventors of the present invention found that by adding aluminum (Al) and/or europium (Eu) to a barium magnesium silicate in addition to iron (Fe), it is possible to obtain a photochromic substance that has lower toxicity, exhibits good sensitivity in a visible light region, changes color deeply (has lower reflectance), has a slow speed of color fading (has a high capacity of retaining the color change), has chemical and thermal stability, and has good durability.

In order to attain the above object, a photochromic substance of the present invention has a composition represented by the following formula (1):

$$Ba_{(a-b)}Ca_bMg_cSi_dO_e:Fe_fM_gM'_h \quad (1)$$

where $1.8 \leq a \leq 2.2$, $0 \leq b \leq 0.1$, $1.4 \leq c \leq 3.5$, $1.8 \leq d \leq 2.2$, $e=(a+c+2d)$, $0.0001 \leq f$, $0.0001 \leq g$, $0 \leq h$, M is at least one of Al and Eu, and M' is at least one element selected from the group consisting of Na, K, Nd, Li, S, C, Ti, V, Mn, Cr, Cu, Ni, Co, Ge, Zn, Ga, Zr, Y, Nb, In, Ag, Mo, Sn, Sb, Bi, Ta, W, La, Ce, Pr, Nd, Sm, Gd, Er, Ho, Tb, Tm, Yb, Lu, P, Cd, and Pb.

According to the arrangement, it is possible to provide a photochromic substance that has lower toxicity, exhibits good sensitivity in a visible light region, changes color deeply (has lower reflectance), has a slow speed of color fading (has a high capacity of retaining the color change), has chemical and thermal stability, and has good durability.

In order to attain the above object, a photochromic material of the present invention contains the photochromic substance. According to the arrangement, it is possible to provide a photochromic material including a photochromic substance that has lower toxicity, exhibits good sensitivity in a visible light region, changes color deeply (has lower reflectance), has a slow speed of color fading (has a high capacity of retaining the color change), has chemical and thermal stability, and has good durability.

In order to attain the above object, a method of the present invention for producing a photochromic substance includes the step of burning a mixture of (i) a raw material group including elements constituting the photochromic substance and (ii) boric acid. According to the method, it is possible to produce a photochromic substance that has lower toxicity, exhibits good sensitivity in a visible light region, changes color deeply (has lower reflectance), has a slow speed of color fading (has a high capacity of retaining the color change), has chemical and thermal stability, and has good durability.

Advantageous Effects of Invention

According to the photochromic substance of the present invention and the method of the present invention for producing the photochromic substance, it is possible to produce an effect of providing (i) a photochromic substance that has lower toxicity, exhibits good sensitivity in a visible light region, changes color deeply (has lower reflectance), has a slow speed of color fading (has a high capacity of retaining the color change), has chemical and thermal stability, and has good durability, and (ii) a method producing the photochromic substance.

The photochromic substance of the present invention is preferably arranged such that in the formula (1), $0.001 \leq g \leq 0.012$. The photochromic substance of the present invention is preferably arranged such that in the formula (1), $0.0001 \leq h$. The photochromic substance of the present invention is preferably arranged such that in the formula (1), M is Al, and $h=0$. According to the arrangements, it is possible to provide a photochromic substance that exhibits a higher photochromism property.

The method of the present invention for producing a photochromic substance is preferably arranged such that the step of burning is carried out in a reductive atmosphere. The method of the present invention for producing a photochromic substance is preferably arranged such that the step of burning is carried out in presence of a hydrogen gas. According to the method, it is possible to produce a photochromic substance that exhibits a higher photochromism property.

DESCRIPTION OF EMBODIMENTS

An embodiment of the present invention is described below in detail.

(Photochromic Substance)

A photochromic substance of the present invention has a composition represented by the following formula (1):

$$Ba_{(a-b)}Ca_bMg_cSi_dO_e:Fe_fM_gM'_h \quad (1)$$

In the formula (1), M is at least one of Al and Eu. Especially, Al is more preferable since Al is easily available, inexpensive, and has low toxicity unlike rare earthes such as Eu. It is a new finding made by the inventors of the present invention that a photochromic substance that exhibits excellent effects can be obtained by adding Al, which is not a rare earth.

In the formula (1), M' is at least one element selected from the group consisting of Na, K, Nd, Li, S, C, Ti, V, Mn, Cr, Cu, Ni, Co, Ge, Zn, Ga, Zr, Y, Nb, In, Ag, Mo, Sn, Sb, Bi, Ta, W, La, Ce, Pr, Nd, Sm, Gd, Er, Ho, Tb, Tm, Yb, Lu, P, Cd, and Pb. It is more preferable that M' include at least one of Cu, Ag, and Au, which are Group 11 elements, and it is further more preferable that M' includes Cu.

In the formula (1), i.e., in the composition ratio of the photochromic substance, $1.8 \le a \le 2.2$, $0 \le b \le 0.1$, $1.4 \le c \le 3.5$, $1.8 \le d \le 2.2$, $e=(a+c+2d)$, $0.0001 \le f$, $0.0001 \le g$, and $0 \le h$.

In the formula (1), $1.9 \le a \le 2.1$ is more preferable. Moreover, $0 \le b \le 0.01$ is more preferable, $0 \le b \le 0.001$ is further more preferable, and $b=0$ is especially preferable. Moreover, $2.0 \le c \le 3.5$ is more preferable, and $2.5 \le c \le 3$ is further more preferable. Moreover, $1.9 \le d \le 2.1$ is more preferable. Moreover, $0.0005 \le f$ is more preferable, $0.001 \le f$ is further more preferable, and $0.002 \le f$ is especially preferable. Moreover, $f \le 2$ is more preferable, $f \le 1$ is further more preferable, $f \le 0.5$ is especially preferable, and $f \le 0.2$ is most preferable. Moreover, $0.0005 \le g$ is more preferable, and $0.001 \le g$ is further more preferable. Moreover, $g \le 0.025$ is more preferable, and $g \le 0.012$ is further more preferable. Moreover, $0.0001 \le h$ is more preferable, $0.0005 \le h$ is further more preferable, and $0.001 \le h$ is especially preferable. Moreover, $h \le 0.025$ is more preferable, and $h \le 0.012$ is further more preferable. This makes it possible to provide a photochromic substance that exhibits a higher photochromism property. Furthermore, in the formula (1), it is especially preferable that M is Al and $h=0$.

The photochromic substance of the present invention that has the above composition is a substance based on barium magnesium silicate. The photochromic substance of the present invention has a tridymite structure, i.e., a structure in which $SiO_4$ tetrahydrons are connected with each other via their vertexes, and thus forms a three-dimensional tunnel structure. The photochromic substance of the present invention has a structure in which a certain percentage of silicon ions ($Si^{4+}$) in the $SiO_4$ tetrahydrons is replaced with a magnesium ion ($Mg^{2+}$) and a barium ion ($Ba^{2+}$) and the like are embedded in the three-dimensional tunnel structure.

With the above composition, the photochromic substance of the present invention exhibits a good photochromism property in a visible light region. For example, the photochromic substance of the present invention has a property of changing its color from white to red (pink) upon application of blue light (e.g., light having a wavelength of 405 nm) and a property of changing its color from white to deep red (pink) upon application of ultraviolet light (e.g., light having a wavelength of 365 nm). That is, with the above composition, the photochromic substance of the present invention is controllable as to how deeply its color changes (reflectance), depending on a wavelength of light with which the photochromic substance is irradiated.

In addition, the photochromic substance of the present invention has a property of undergoing color fading and returning to its original color (white), for example, upon application of green light (e.g., light having a wavelength of 532 nm) in a state where the photochromic substance has changed to red or deep red by application of the above light. That is, the photochromic substance of the present invention has a good reversible property. Moreover, the photochromic substance of the present invention has good durability because it observes almost no influence on the color change and color fading even after 10 or more applications of ultraviolet light and green light.

Furthermore, the photochromic substance of the present invention has high resistance to heat in terms of a state of color change caused due to the photochromism property, and can retain the state of color change, for example, up to approximately 100° C. Moreover, once the photochromic substance of the present invention exhibits a photochromism property, the state of color change can be retained for a long period (e.g. several hundred days).

That is, with the composition, the photochromic substance of the present invention has lower toxicity, exhibits good sensitivity in a visible light region, changes color deeply (has lower reflectance), has a slow speed of color fading (has a high capacity of retaining the color change), has chemical and thermal stability, and has good durability.

A photochromic material of the present invention contains the photochromic substance. The photochromic material of the present invention may contain one (1) kind of photochromic substance or may contain plural kinds of photochromic substances that are different from each other in composition. An amount of the photochromic substance contained in the photochromic material is not limited in particular, provided that the photochromic substance can achieve a photochromism property in accordance with application of the photochromic material. Since the photochromic material of the present invention contains the photochromic substance, the photochromic material of the present invention has lower toxicity, exhibits good sensitivity in a visible light region, changes color deeply (has lower reflectance), has a slow speed of color fading (has a high capacity of retaining the color change), has chemical and thermal stability, and has good durability.

Specific examples of the photochromic material encompass various industrial products such as an optical disc (ultrahigh-density memory), an optical switch, optical printing ink, a display, sunglasses, and light control glass.

(Method for Producing Photochromic Substance)

The photochromic substance of the present invention can be produced by a production method including the burning step of burning a mixture of (i) a raw material group including elements constituting the photochromic substance and (ii) boric acid ($B(OH)_3$). The mixture may further contain, in addition to the raw material group and boric acid, other compounds such as boron oxide, boron fluoride, boron carbide, and magnesium fluoride, as long as these compounds do not inhibit the photochromism property.

The raw material group is more specifically described below. Examples of a raw material containing Ba encompass barium carbonate, barium sulfate, barium oxide, barium nitrate, barium hydroxide, barium silicide, and barium borate. Examples of a raw material containing Ca encompass calcium carbonate, calcium oxide, calcium nitrate, calcium hydroxide, calcium borate, and calcium acetate. Examples of a raw material containing Mg encompass magnesium carbonate. Examples of a raw material containing Si encompass silicon and silicon dioxide. Examples of a raw material containing Fe encompass iron oxides having respective oxidation numbers. Examples of a raw material containing Eu encompass europium oxides having respective oxidation numbers and europium nitrate. Examples of a raw material containing Al encompass aluminum oxide and aluminum acetate. Examples of a raw material containing an element represented by M' in the formula (1) encompass oxides, hydroxides, carbonates, sulfates, and nitrates of the element. The oxygen (O) constituting the photochromic substance of the present invention is derived from oxygen contained in oxides and hydroxides in the raw material group. That is, the oxides and hydroxides in the raw material group are also raw materials containing O. It is therefore preferable that at least one of the raw materials in the raw material group contains O.

By adjusting an amount of the raw materials contained (blended) in the mixture, it is possible to produce a photochromic substance having a desired composition.

Boric acid is added to the raw material group in order that the raw material group is burnt in the burning step in a reductive atmosphere. An amount of boric acid in the mixture is not limited in particular, but is preferably in a range from 2 mol % to 10 mol % with respect to Ba contained in a Ba-containing raw material in the raw material group. That is, it is preferable that the mixture be prepared by mixing, with the raw material group, boric acid of an amount in a range from 2 mol % to 10 mol % with respect to Ba. Through the burning, boric acid evaporates as boric oxide. Accordingly, the photochromic substance contains substantially no boron.

The mixture may further contain a solvent such as ethyl alcohol so that the raw material group and boric acid are mixed more uniformly. A method of mixing the raw material group, boric acid, solvent, and the like is not limited in particular, provided that they can be mixed as uniformly as possible.

The burning step of burning the mixture is more preferably carried out in a reductive atmosphere, further more preferably in the presence of a hydrogen gas. One specific example of a burning method is a method of burning the mixture in a flow of a mixture gas of an inactive gas such as an argon gas and a reducing gas such as a hydrogen gas. A concentration of the hydrogen gas in the mixture gas is preferably in a range from 2% by volume to 10% by volume. One example of a burning condition for the burning step is 1200° C. to 1400° C. and 1 to 5 hours. Note, however, that the burning condition such as a burning temperature, a burning time, and a flow amount of the mixture gas is not limited in particular, and can be set as appropriate to an optimum condition in accordance with the composition of the photochromic substance. Furthermore, a rate of temperature increase (heating rate) and a rate of temperature drop (cooling rate) are not limited in particular, and can be set as appropriate to an optimum condition. As a burning device for the burning step, a commercially available device can be used.

It is estimated that by thus burning the mixture preferably in a reductive atmosphere, an oxygen defect occurs in a crystal structure of the photochromic substance, which is a burnt product, and that the oxygen defect is involved with the photochromism property. It is therefore possible to produce a photochromic substance that exhibits a higher photochromism property.

EXAMPLES

The present invention is described below in more detail based on Examples. Note, however, that the present invention is not limited to the Examples below.

Example 1

$Ba_2Mg_{2.5}Si_2O_{8.25}: Fe_{0.004}Al_{0.001}$

As a raw material group, powders of barium carbonate ($BaCO_3$), magnesium carbonate ($MgCO_3$), silicon dioxide ($SiO_2$), ferric oxide ($Fe_2O_3$), and aluminum oxide ($Al_2O_3$) were taken so that a molar ratio of the metal components was 2:2.5:2:0.004:0.001. To the raw material group, boric acid was added in an amount of 10 mol % with respect to Ba contained in the raw material group and ethyl alcohol was added (approximately 30 mL to 80 mL with respect to the total amount (approximately 8 g) of the raw material group and the boric acid). They were fully mixed to obtain a mixture.

After the mixture was dried naturally, a pellet having a diameter of 20 mm and a thickness of 5 mm was prepared from the mixture. The pellet was burnt with the use of an electrical furnace at 1300° C. for 4 hours in a mixture gas containing argon (95% by volume) and hydrogen (5% by volume). In this way, a sample A having a composition represented by $Ba_2Mg_{2.5}Si_2O_{8.25}: Fe_{0.004}Al_{0.001}$ was prepared.

The sample A was irradiated, at room temperature (25° C.) for 3 minutes, with visible light (7.2 mW/cm²) having a wavelength of 405 nm. As a result, the sample A underwent a color change from white to red. It was thus confirmed that the sample A exhibited photochromism. Furthermore, the sample A was irradiated with visible light (output: 556 mW/cm²) having a wavelength of 405 nm with use of a laser, and 3 minutes later from the irradiation, its reflectance of light having a wavelength of 523 nm, which is a maximum value in an absorbance spectrum of the sample A, was measured at room temperature (25° C.) in an atmosphere with the use of an ultraviolet visible spectrometer to evaluate a photochromism property of the sample A. The measurement was carried out under the condition that a measurement range be 500 nm to 600 nm, a slit width be 1 nm, and a scanning speed be 100 nm/min, and an integrating sphere was used. As a result of the measurement, it was revealed that the reflectance was 13.55%.

Example 2

$Ba_2Mg_{2.5}Si_2O_{8.25}: Fe_{0.004}Al_{0.002}$

Similar processes to those of Example 1 were carried out except for that aluminum oxide ($Al_2O_3$) was taken so that a molar ratio of aluminum is 0.002. A sample B having a composition represented by $Ba_2Mg_{2.5}Si_2O_{8.25}: Fe_{0.004}Al_{0.002}$ was thus prepared. A photochromism property of the sample B was evaluated in a similar manner to Example 1. As a result, it was revealed that reflectance of the sample B was 12.64%.

Example 3

$Ba_2Mg_{2.5}Si_2O_{8.25}: Fe_{0.004}Al_{0.004}$

Similar processes to those of Example 1 were carried out except for that aluminum oxide ($Al_2O_3$) was taken so that a molar ratio of aluminum is 0.004. A sample C having a composition represented by $Ba_2Mg_{2.5}Si_2O_{8.25}: Fe_{0.004}Al_{0.004}$ was thus prepared. A photochromism property of the sample C was evaluated in a similar manner to Example 1. As a result, it was revealed that reflectance of the sample C was 12.63%.

Figure 1:
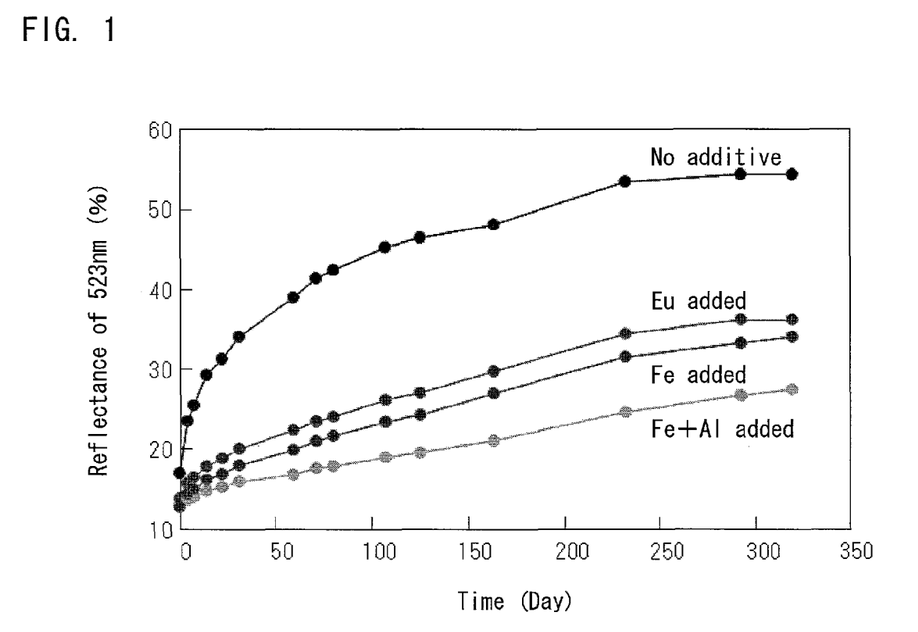
FIG. 1 is a graph, concerning a photochromic substance of the present invention and a photochromic substance for comparison, showing time dependency of a photochromism property.

Next, the sample C was irradiated with visible light having a wavelength of 405 nm in a similar manner to Example 1, and 4, 7, 14, 22, 31, 59, 71, 80, 107, 125, 163, 232, 292, and 319 days later from the irradiation, its reflectance of light having a wavelength of 523 nm was measured to evaluate time dependency of the photochromism property of the sample C. The result is shown in FIG. 1. In FIG. 1, the result of the sample C is indicated by "Fe+Al added".

Example 4

$Ba_2Mg_{2.5}Si_2O_{8.25}: Fe_{0.004}Al_{0.006}$

Similar processes to those of Example 1 were carried out except for that aluminum oxide ($Al_2O_3$) was taken so that a molar ratio of aluminum is 0.006. A sample D having a composition represented by $Ba_2Mg_{2.5}Si_2O_{8.25}:$ $Fe_{0.004}Al_{0.006}$ was thus prepared. A photochromism property of the sample D was evaluated in a similar manner to Example 1. As a result, it was revealed that reflectance of the sample D was 12.56%.

Example 5

$Ba_2Mg_{2.5}Si_2O_{8.25}: Fe_{0.004}Al_{0.012}$

Similar processes to those of Example 1 were carried out except for that aluminum oxide ($Al_2O_3$) was taken so that a molar ratio of aluminum is 0.012. A sample E having a composition represented by $Ba_2Mg_{2.5}Si_2O_{8.25}\ Fe_{0.004}Al_{0.012}$ was thus prepared. A photochromism property of the sample E was evaluated in a similar manner to Example 1. As a result, it was revealed that reflectance of the sample E was 12.51%.

Example 6

$Ba_2Mg_{2.5}Si_2O_{8.25}: Fe_{0.004}Eu_{0.001}$

Similar processes to those of Example 1 were carried out except for that europium oxide ($Eu_2O_3$) was used instead of aluminum oxide ($Al_2O_3$). A sample F having a composition represented by $Ba_2Mg_{2.5}Si_2O_{8.25}: Fe_{0.004}Eu_{0.001}$ was thus prepared. A photochromism property of the sample F was evaluated in a similar manner to Example 1. As a result, it was revealed that reflectance of the sample F was 13.65%.

Example 7

$Ba_2Mg_{2.5}Si_2O_{8.25}: Fe_{0.004}Eu_{0.001}Cu_{0.001}$

Similar processes to those of Example 1 were carried out except for that powders of barium carbonate ($BaCO_3$), magnesium carbonate ($MgCO_3$), silicon dioxide ($SiO_2$), ferric oxide ($Fe_2O_3$), europium oxide ($Eu_2O_3$), and cupric oxide (CuO) were taken as a raw material group so that a molar ratio of the metal components is 2:2.5:2:0.004:0.001:0.001. A sample G having a composition represented by $Ba_2Mg_{2.5}Si_2O_{8.25}: Fe_{0.004}Eu_{0.001}Cu_{0.001}$ was thus prepared. A photochromism property of the sample G was evaluated in a similar manner to Example 1. As a result, it was revealed that reflectance of the sample G was 13.71%.

Comparative Example 1

$Ba_2Mg_{2.5}Si_2O_{8.25}: Fe_{0.004}$

Similar processes to those of Example 1 were carried out except for that powders of barium carbonate ($BaCO_3$), magnesium carbonate ($MgCO_3$), silicon dioxide ($SiO_2$), and ferric oxide ($Fe_2O_3$) were taken as a raw material group so that a molar ratio of the metal components is 2:2.5:2:0.004. A sample a for comparison having a composition represented by $Ba_2Mg_{2.5}Si_2O_{8.25}: Fe_{0.004}$ was thus prepared. A photochromism property of the sample a was evaluated in a similar manner to Example 1. As a result, it was revealed that reflectance of the sample a was 13.89%.

Next, the sample a was irradiated with visible light having a wavelength of 405 nm in a similar manner to Example 1, and 4, 7, 14, 22, 31, 59, 71, 80, 107, 125, 163, 232, 292, and 319 days later from the irradiation, its reflectance of light having a wavelength of 523 nm was measured to evaluate time dependency of the photochromism property of the sample a. The result is shown in FIG. 1. In FIG. 1, the result of the sample a is indicated by "Fe added".

Comparative Example 2

$Ba_2Mg_{2.5}Si_2O_{8.25}: Fe_{0.004}Cu_{0.001}$

Similar processes to those of Example 1 were carried out except for that cupric oxide (CuO) was used instead of aluminum oxide ($Al_2O_3$). A sample b for comparison having a composition represented by $Ba_2Mg_{2.5}Si_2O_{8.25}: Fe_{0.004}Cu_{0.001}$ was thus prepared. A photochromism property of the sample b was evaluated in a similar manner to Example 1. As a result, it was revealed that reflectance of the sample b was 14.44%.

Comparative Example 3

$Ba_2Mg_{2.5}Si_2O_{8.25}: Fe_{0.004}Mo_{0.001}$

Similar processes to those of Example 1 were carried out except for that molybdenum trioxide ($MoO_3$) was used instead of aluminum oxide ($Al_2O_3$). A sample c for comparison having a composition represented by $Ba_2Mg_{2.5}Si_2O_{8.25}: Fe_{0.004}Mo_{0.001}$ was thus prepared. A photochromism property of the sample c was evaluated in a similar manner to Example 1. As a result, it was revealed that reflectance of the sample c was 14.77%.

Comparative Example 4

$Ba_2Mg_{2.5}Si_2O_{8.25}: Fe_{0.004}Li_{0.001}$

Similar processes to those of Example 1 were carried out except for that lithium oxide ($Li_2O$) was used instead of aluminum oxide ($Al_2O_3$). A sample d for comparison having a composition represented by $Ba_2Mg_{2.5}Si_2O_{8.25}: Fe_{0.004}Li_{0.001}$ was thus prepared. A photochromism property of the sample d was evaluated in a similar manner to Example 1. As a result, it was revealed that reflectance of the sample d was 15.19%.

Comparative Example 5

$Ba_2Mg_{2.5}Si_2O_{8.25}: Fe_{0.004}Na_{0.001}$

Similar processes to those of Example 1 were carried out except for that sodium oxide ($Na_2O$) was used instead of aluminum oxide ($Al_2O_3$). A sample e for comparison having a composition represented by $Ba_2Mg_{2.5}Si_2O_{8.25}: Fe_{0.004}Na_{0.001}$ was thus prepared. A photochromism property of the sample e was evaluated in a similar manner to Example 1. As a result, it was revealed that reflectance of the sample e was 15.48%.

Comparative Example 6

$Ba_2Mg_{2.5}Si_2O_{8.25}: Fe_{0.004}P_{0.001}$

Similar processes to those of Example 1 were carried out except for that diphosphorus pentaoxide ($P_2O_5$) was used instead of aluminum oxide ($Al_2O_3$). A sample f for comparison having a composition represented by $Ba_2Mg_{2.5}Si_2O_{8.25}: Fe_{0.004}P_{0.001}$ was thus prepared. A photochromism property of the sample f was evaluated in a similar manner to Example 1. As a result, it was revealed that reflectance of the sample f was 15.20%.

Comparative Example 7

$Ba_2Mg_{2.5}Si_2O_{8.25}$: $Fe_{0.004}S_{0.001}$

Similar processes to those of Example 1 were carried out except for that sulfur (S) was used instead of aluminum oxide ($Al_2O_3$). A sample g for comparison having a composition represented by $Ba_2Mg_{2.5}Si_2O_{8.25}$: $Fe_{0.004}S_{0.001}$ was thus prepared. A photochromism property of the sample g was evaluated in a similar manner to Example 1. As a result, it was revealed that reflectance of the sample g was 15.23%.

Comparative Example 8

$Ba_2Mg_{2.5}Si_2O_{8.25}$: $Fe_{0.004}K_{0.001}$

Similar processes to those of Example 1 were carried out except for that potassium oxide ($K_2O$) was used instead of aluminum oxide ($Al_2O_3$). A sample h for comparison having a composition represented by $Ba_2Mg_{2.5}Si_2O_{8.25}$: $Fe_{0.004}K_{0.001}$ was thus prepared. A photochromism property of the sample h was evaluated in a similar manner to Example 1. As a result, it was revealed that reflectance of the sample h was 25.32%.

Comparative Example 9

$Ba_2Mg_{2.5}Si_2O_{8.25}$: $Fe_{0.004}Ti_{0.001}$

Similar processes to those of Example 1 were carried out except for that titanium dioxide ($TiO_2$) was used instead of aluminum oxide ($Al_2O_3$). A sample i for comparison having a composition represented by $Ba_2Mg_{2.5}Si_2O_{8.25}$: $Fe_{0.004}Ti_{0.001}$ was thus prepared. A photochromism property of the sample i was evaluated in a similar manner to Example 1. As a result, it was revealed that reflectance of the sample i was 18.30%.

Comparative Example 10

$Ba_2Mg_{2.5}Si_2O_{8.25}$: $Fe_{0.004}Cr_{0.001}$

Similar processes to those of Example 1 were carried out except for that chromium trioxide ($CrO_3$) was used instead of aluminum oxide ($Al_2O_3$). A sample j for comparison having a composition represented by $Ba_2Mg_{2.5}Si_2O_{8.25}$: $Fe_{0.004}Cr_{0.001}$ was thus prepared. A photochromism property of the sample j was evaluated in a similar manner to Example 1. As a result, it was revealed that reflectance of the sample j was 14.96%.

Comparative Example 11

$Ba_2Mg_{2.5}Si_2O_{8.25}$: $Fe_{0.004}V_{0.001}$

Similar processes to those of Example 1 were carried out except for that divanadium pentoxide ($V_2O_5$) was used instead of aluminum oxide ($Al_2O_3$). A sample k for comparison having a composition represented by $Ba_2Mg_{2.5}Si_2O_{8.25}$: $Fe_{0.004}V_{0.001}$ was thus prepared. A photochromism property of the sample k was evaluated in a similar manner to Example 1. As a result, it was revealed that reflectance of the sample k was 16.18%.

Comparative Example 12

$Ba_2Mg_{2.5}Si_2O_{8.25}$: $Fe_{0.004}Mn_{0.001}$

Similar processes to those of Example 1 were carried out except for that manganese monoxide (MnO) was used instead of aluminum oxide ($Al_2O_3$). A sample 1 for comparison having a composition represented by $Ba_2Mg_{2.5}Si_2O_{8.25}$: $Fe_{0.004}Mn_{0.001}$ was thus prepared. A photochromism property of the sample 1 was evaluated in a similar manner to Example 1. As a result, it was revealed that reflectance of the sample 1 was 15.51%.

Comparative Example 13

$Ba_2Mg_{2.5}Si_2O_{8.25}$: $Fe_{0.004}Ni_{0.001}$

Similar processes to those of Example 1 were carried out except for that nickel oxide ($Ni_2O_3$) was used instead of aluminum oxide ($Al_2O_3$). A sample m for comparison having a composition represented by $Ba_2Mg_{2.5}Si_2O_{8.25}$: $Fe_{0.004}Ni_{0.001}$ was thus prepared. A photochromism property of the sample m was evaluated in a similar manner to Example 1. As a result, it was revealed that reflectance of the sample m was 18.29%.

Comparative Example 14

$Ba_2Mg_{2.5}Si_2O_{8.25}$: $Fe_{0.004}Zn_{0.001}$

Similar processes to those of Example 1 were carried out except for that zinc oxide (ZnO) was used instead of aluminum oxide ($Al_2O_3$). A sample n for comparison having a composition represented by $Ba_2Mg_{2.5}Si_2O_{8.25}$: $Fe_{0.004}Zn_{0.001}$ was thus prepared. A photochromism property of the sample n was evaluated in a similar manner to Example 1. As a result, it was revealed that reflectance of the sample n was 27.66%.

Comparative Example 15

$Ba_2Mg_{2.5}Si_2O_{8.25}$: $Fe_{0.004}Ga_{0.001}$

Similar processes to those of Example 1 were carried out except for that gallium oxide ($Ga_2O_3$) was used instead of aluminum oxide ($Al_2O_3$). A sample o for comparison having a composition represented by $Ba_2Mg_{2.5}Si_2O_{8.25}$: $Fe_{0.004}Ga_{0.001}$ was thus prepared. A photochromism property of the sample o was evaluated in a similar manner to Example 1. As a result, it was revealed that reflectance of the sample o was 15.75%.

Comparative Example 16

$Ba_2Mg_{2.5}Si_2O_{8.25}$: $Fe_{0.004}Ge_{0.001}$

Similar processes to those of Example 1 were carried out except for that germanium dioxide ($GeO_2$) was used instead of aluminum oxide ($Al_2O_3$). A sample p for comparison having a composition represented by $Ba_2Mg_{2.5}Si_2O_{8.25}$: $Fe_{0.004}Ge_{0.001}$ was thus prepared. A photochromism property of the sample p was evaluated in a similar manner to Example 1. As a result, it was revealed that reflectance of the sample p was 15.44%.

Comparative Example 17

$Ba_2Mg_{2.5}Si_2O_{8.25}$: $Fe_{0.004}Y_{0.001}$

Similar processes to those of Example 1 were carried out except for that yttrium oxide ($Y_2O_3$) was used instead of aluminum oxide ($Al_2O_3$). A sample q for comparison having a composition represented by $Ba_2Mg_{2.5}Si_2O_{8.25}$: $Fe_{0.004}Y_{0.001}$ was thus prepared. A photochromism property of the sample q was evaluated in a similar manner to Example 1. As a result, it was revealed that reflectance of the sample q was 14.92%.

Comparative Example 18

$Ba_2Mg_{2.5}Si_2O_{8.25}$: $Fe_{0.004}Zr_{0.001}$

Similar processes to those of Example 1 were carried out except for that zirconium oxide ($ZrO_2$) was used instead of aluminum oxide ($Al_2O_3$). A sample r for comparison having a composition represented by $Ba_2Mg_{2.5}Si_2O_{8.25}$: $Fe_{0.004}Zr_{0.001}$ was thus prepared. A photochromism property of the sample r was evaluated in a similar manner to Example 1. As a result, it was revealed that reflectance of the sample r was 14.60%.

Comparative Example 19

$Ba_2Mg_{2.5}Si_2O_{8.25}$: $Fe_{0.004}In_{0.001}$

Similar processes to those of Example 1 were carried out except for that indium oxide ($In_2O_3$) was used instead of aluminum oxide ($Al_2O_3$). A sample s for comparison having a composition represented by $Ba_2Mg_{2.5}Si_2O_{8.25}$: $Fe_{0.004}In_{0.001}$ was thus prepared. A photochromism property of the sample s was evaluated in a similar manner to Example 1. As a result, it was revealed that reflectance of the sample s was 14.84%.

Comparative Example 20

$Ba_2Mg_{2.5}Si_2O_{8.25}$: $Fe_{0.004}Sn_{0.001}$

Similar processes to those of Example 1 were carried out except for that stannic oxide ($SnO_2$) was used instead of aluminum oxide ($Al_2O_3$). A sample t for comparison having a composition represented by $Ba_2Mg_{2.5}Si_2O_{8.25}$: $Fe_{0.004}Sn_{0.001}$ was thus prepared. A photochromism property of the sample t was evaluated in a similar manner to Example 1. As a result, it was revealed that reflectance of the sample t was 14.14%.

Comparative Example 21

$Ba_2Mg_{2.5}Si_2O_{8.25}$: $Fe_{0.004}Sb_{0.001}$

Similar processes to those of Example 1 were carried out except for that antimony pentoxide ($Sb_2O_5$) was used instead of aluminum oxide ($Al_2O_3$). A sample u for comparison having a composition represented by $Ba_2Mg_{2.5}Si_2O_{8.25}$: $Fe_{0.004}Sb_{0.001}$ was thus prepared. A photochromism property of the sample u was evaluated in a similar manner to Example 1. As a result, it was revealed that reflectance of the sample u was 14.36%.

Comparative Example 22

$Ba_2Mg_{2.5}Si_2O_{8.25}$: $Fe_{0.004}La_{0.001}$

Similar processes to those of Example 1 were carried out except for that lanthanum oxide ($La_2O_3$) was used instead of aluminum oxide ($Al_2O_3$). A sample v for comparison having a composition represented by $Ba_2Mg_{2.5}Si_2O_{8.25}$: $Fe_{0.004}La_{0.001}$ was thus prepared. A photochromism property of the sample v was evaluated in a similar manner to Example 1. As a result, it was revealed that reflectance of the sample v was 14.39%.

Comparative Example 23

$Ba_2Mg_{2.5}Si_2O_{8.25}$: $Fe_{0.004}Ta_{0.001}$

Similar processes to those of Example 1 were carried out except for that tantalum pentoxide ($Ta_2O_5$) was used instead of aluminum oxide ($Al_2O_3$). A sample w for comparison having a composition represented by $Ba_2Mg_{2.5}Si_2O_{8.25}$: $Fe_{0.004}Ta_{0.001}$ was thus prepared. A photochromism property of the sample w was evaluated in a similar manner to Example 1. As a result, it was revealed that reflectance of the sample w was 13.96%.

Comparative Example 24

$Ba_2Mg_{2.5}Si_2O_{8.25}$: $Fe_{0.004}W_{0.001}$

Similar processes to those of Example 1 were carried out except for that tungsten trioxide ($WO_3$) was used instead of aluminum oxide ($Al_2O_3$). A sample x for comparison having a composition represented by $Ba_2Mg_{2.5}Si_2O_{8.25}$: $Fe_{0.004}W_{0.001}$ was thus prepared. A photochromism property of the sample x was evaluated in a similar manner to Example 1. As a result, it was revealed that reflectance of the sample x was 15.50%.

Comparative Example 25

$Ba_2Mg_{2.5}Si_2O_{8.25}$: $Fe_{0.004}Pb_{0.001}$

Similar processes to those of Example 1 were carried out except for that lead dioxide ($PbO_2$) was used instead of aluminum oxide ($Al_2O_3$). A sample y for comparison having a composition represented by $Ba_2Mg_{2.5}Si_2O_{8.25}$: $Fe_{0.004}Pb_{0.001}$ was thus prepared. A photochromism property of the sample y was evaluated in a similar manner to Example 1. As a result, it was revealed that reflectance of the sample y was 15.17%.

Comparative Example 26

$Ba_2Mg_{2.5}Si_2O_{8.25}$: $Fe_{0.004}Bi_{0.001}$

Similar processes to those of Example 1 were carried out except for that bismuth oxide ($Bi_2O_3$) was used instead of aluminum oxide ($Al_2O_3$). A sample z for comparison having a composition represented by $Ba_2Mg_{2.5}Si_2O_{8.25}$: $Fe_{0.004}Bi_{0.001}$ was thus prepared. A photochromism property of the sample z was evaluated in a similar manner to Example 1. As a result, it was revealed that reflectance of the sample z was 14.55%.

Comparative Example 27

$Ba_2Mg_{2.5}Si_2O_{8.25}$: $Fe_{0.004}Nb_{0.001}$

Similar processes to those of Example 1 were carried out except for that niobium oxide ($Nb_2O_5$) was used instead of aluminum oxide ($Al_2O_3$). A sample aa for comparison having a composition represented by $Ba_2Mg_{2.5}Si_2O_{8.25}$: $Fe_{0.004}Nb_{0.001}$ was thus prepared. A photochromism property of the sample aa was evaluated in a similar manner to Example 1. As a result, it was revealed that reflectance of the sample aa was 13.92%.

Comparative Example 28

$Ba_2Mg_{2.5}Si_2O_{8.25}$: $Fe_{0.004}Eu_{0.001}Cu_{0.001}$

Similar processes to those of Example 1 were carried out except for that powders of barium carbonate ($BaCO_3$), magnesium carbonate ($MgCO_3$), silicon dioxide ($SiO_2$), ferric oxide ($Fe_2O_3$), europium oxide ($Eu_2O_3$), and cobalt oxide ($Co_2O_3$) were taken as a raw material group so that a molar ratio of the metal components is 2:2.5:2:0.004:0.001:0.001. A sample ab for comparison having a composition represented by $Ba_2Mg_{2.5}Si_2O_{8.25}$: $Fe_{0.004}Eu_{0.001}Co_{0.001}$ was thus prepared. A photochromism property of the sample ab was evaluated in a similar manner to Example 1. As a result, it was revealed that reflectance of the sample ab was 14.96%.

Comparative Example 29

$Ba_2Mg_{2.5}Si_2O_{8.25}$: $Eu_{0.004}$

Similar processes to those of Example 1 were carried out except for that powders of barium carbonate ($BaCO_3$), magnesium carbonate ($MgCO_3$), silicon dioxide ($SiO_2$), and europium oxide ($Eu_2O_3$) were taken as a raw material group so that a molar ratio of the metal components is 2:2.5:2:0.004. A sample ac for comparison having a composition represented by $Ba_2Mg_{2.5}Si_2O_{8.25}$: $Eu_{0.004}$ was thus prepared. A photochromism property of the sample ac was evaluated in a similar manner to Example 1. As a result, it was revealed that reflectance of the sample ac was 16.18%.

Next, the sample ac was irradiated with visible light having a wavelength of 405 nm in a similar manner to Example 1, and 4, 7, 14, 22, 31, 59, 71, 80, 107, 125, 163, 232, 292, and 319 days later from the irradiation, its reflectance of light having a wavelength of 523 nm was measured to evaluate time dependency of the photochromism property of the sample ac. The result is shown in FIG. 1. In FIG. 1, the result of the sample ac is indicated by "Eu added".

Reference Example 1

$Ba_2Mg_{2.5}Si_2O_{8.25}$

Similar processes to those of Example 1 were carried out except for that powders of barium carbonate ($BaCO_3$), magnesium carbonate ($MgCO_3$), and silicon dioxide ($SiO_2$) were taken as a raw material group so that a molar ratio of the metal components is 2:2.5:2. A sample α for reference having a composition represented by $Ba_2Mg_{2.5}Si_2O_{8.25}$ was thus prepared. A photochromism property of the sample α was evaluated in a similar manner to Example 1. As a result, it was revealed that reflectance of the sample α is 27.53%.

Next, the sample α was irradiated with visible light having a wavelength of 405 nm in a similar manner to Example 1, and 4, 7, 14, 22, 31, 59, 71, 80, 107, 125, 163, 232, 292, and 319 days later from the irradiation, its reflectance of light having a wavelength of 523 nm was measured to evaluate time dependency of the photochromism property of the sample α. The result is shown in FIG. 1. In FIG. 1, the result of the sample α is indicated by "No additive".

[Discussion]

Table 1 summarizes the results of reflectance (%) of light having a wavelength of 523 nm measured in Examples 1 to 7, Comparative Examples 1 to 29, and Reference Example 1 above.

TABLE 1

| | Sample | Composition Formula | Reflectance (%) |
|---|---|---|---|
| Ex. 1 | A | $Ba_2Mg_{2.5}Si_2O_{8.25}$: $Fe_{0.004}Al_{0.001}$ | 13.55 |
| Ex. 2 | B | $Ba_2Mg_{2.5}Si_2O_{8.25}$: $Fe_{0.004}Al_{0.002}$ | 12.64 |
| Ex. 3 | C | $Ba_2Mg_{2.5}Si_2O_{8.25}$: $Fe_{0.004}Al_{0.004}$ | 12.63 |
| Ex. 4 | D | $Ba_2Mg_{2.5}Si_2O_{8.25}$: $Fe_{0.004}Al_{0.006}$ | 12.56 |
| Ex. 5 | E | $Ba_2Mg_{2.5}Si_2O_{8.25}$: $Fe_{0.004}Al_{0.012}$ | 12.51 |
| Ex. 6 | F | $Ba_2Mg_{2.5}Si_2O_{8.25}$: $Fe_{0.004}Eu_{0.001}$ | 13.65 |
| Ex. 7 | G | $Ba_2Mg_{2.5}Si_2O_{8.25}$: $Fe_{0.004}Eu_{0.001}Cu_{0.001}$ | 13.71 |
| Com. Ex. 1 | a | $Ba_2Mg_{2.5}Si_2O_{8.25}$: $Fe_{0.004}$ | 13.89 |
| Com. Ex. 2 | b | $Ba_2Mg_{2.5}Si_2O_{8.25}$: $Fe_{0.004}Cu_{0.001}$ | 14.44 |
| Com. Ex. 3 | c | $Ba_2Mg_{2.5}Si_2O_{8.25}$: $Fe_{0.004}Mo_{0.001}$ | 14.77 |
| Com. Ex. 4 | d | $Ba_2Mg_{2.5}Si_2O_{8.25}$: $Fe_{0.004}Li_{0.001}$ | 15.19 |
| Com. Ex. 5 | e | $Ba_2Mg_{2.5}Si_2O_{8.25}$: $Fe_{0.004}Na_{0.001}$ | 15.48 |
| Com. Ex. 6 | f | $Ba_2Mg_{2.5}Si_2O_{8.25}$: $Fe_{0.004}P_{0.001}$ | 15.20 |
| Com. Ex. 7 | g | $Ba_2Mg_{2.5}Si_2O_{8.25}$: $Fe_{0.004}S_{0.001}$ | 15.23 |
| Com. Ex. 8 | h | $Ba_2Mg_{2.5}Si_2O_{8.25}$: $Fe_{0.004}K_{0.001}$ | 25.32 |
| Com. Ex. 9 | i | $Ba_2Mg_{2.5}Si_2O_{8.25}$: $Fe_{0.004}Ti_{0.001}$ | 18.30 |
| Com. Ex. 10 | j | $Ba_2Mg_{2.5}Si_2O_{8.25}$: $Fe_{0.004}Cr_{0.001}$ | 14.96 |
| Com. Ex. 11 | k | $Ba_2Mg_{2.5}Si_2O_{8.25}$: $Fe_{0.004}V_{0.001}$ | 16.18 |
| Com. Ex. 12 | l | $Ba_2Mg_{2.5}Si_2O_{8.25}$: $Fe_{0.004}Mn_{0.001}$ | 15.51 |
| Com. Ex. 13 | m | $Ba_2Mg_{2.5}Si_2O_{8.25}$: $Fe_{0.004}Ni_{0.001}$ | 18.29 |
| Com. Ex. 14 | n | $Ba_2Mg_{2.5}Si_2O_{8.25}$: $Fe_{0.004}Zn_{0.001}$ | 27.66 |
| Com. Ex. 15 | o | $Ba_2Mg_{2.5}Si_2O_{8.25}$: $Fe_{0.004}Ga_{0.001}$ | 15.75 |
| Com. Ex. 16 | p | $Ba_2Mg_{2.5}Si_2O_{8.25}$: $Fe_{0.004}Ge_{0.001}$ | 15.44 |
| Com. Ex. 17 | q | $Ba_2Mg_{2.5}Si_2O_{8.25}$: $Fe_{0.004}Y_{0.001}$ | 14.92 |
| Com. Ex. 18 | r | $Ba_2Mg_{2.5}Si_2O_{8.25}$: $Fe_{0.004}Zr_{0.001}$ | 14.60 |
| Com. Ex. 19 | s | $Ba_2Mg_{2.5}Si_2O_{8.25}$: $Fe_{0.004}In_{0.001}$ | 14.84 |
| Com. Ex. 20 | t | $Ba_2Mg_{2.5}Si_2O_{8.25}$: $Fe_{0.004}Sn_{0.001}$ | 14.14 |
| Com. Ex. 21 | u | $Ba_2Mg_{2.5}Si_2O_{8.25}$: $Fe_{0.004}Sb_{0.001}$ | 14.36 |
| Com. Ex. 22 | v | $Ba_2Mg_{2.5}Si_2O_{8.25}$: $Fe_{0.004}La_{0.001}$ | 14.39 |
| Com. Ex. 23 | w | $Ba_2Mg_{2.5}Si_2O_{8.25}$: $Fe_{0.004}Ta_{0.001}$ | 13.96 |
| Com. Ex. 24 | x | $Ba_2Mg_{2.5}Si_2O_{8.25}$: $Fe_{0.004}W_{0.001}$ | 15.50 |
| Com. Ex. 25 | y | $Ba_2Mg_{2.5}Si_2O_{8.25}$: $Fe_{0.004}Pb_{0.001}$ | 15.17 |
| Com. Ex. 26 | z | $Ba_2Mg_{2.5}Si_2O_{8.25}$: $Fe_{0.004}Bi_{0.001}$ | 14.55 |
| Com. Ex. 27 | aa | $Ba_2Mg_{2.5}Si_2O_{8.25}$: $Fe_{0.004}Nb_{0.001}$ | 13.92 |
| Com. Ex. 28 | ab | $Ba_2Mg_{2.5}Si_2O_{8.25}$: $Fe_{0.004}Eu_{0.001}Co_{0.001}$ | 14.96 |
| Com. Ex. 29 | ac | $Ba_2Mg_{2.5}Si_2O_{8.25}$: $Eu_{0.004}$ | 16.18 |
| Ref. Ex. 1 | α | $Ba_2Mg_{2.5}Si_2O_{8.25}$ | 27.53 |

Abbreviation: "Ex." represents "Example", "Com. Ex." represents "Comparative Example", and "Ref. Ex." represents "Reference Example".

FIG. 1 is a graph concerning the photochromic substance of the present invention and photochromic substances for comparison, specifically, a graph showing time dependency of the photochromism properties evaluated in Example 3, Comparative Examples 1 and 29, and Reference Example 1. In the graph, the horizontal axis represents a time from irradiation of light having a wavelength of 405 nm to measurement of reflectance of light having a wavelength of 523 nm, and the vertical axis represents the reflectance (%) of the light having a wavelength of 523 nm.

As is clear from FIG. 1, addition of iron (Fe) and aluminum (Al) to barium magnesium silicate ($Ba_2Mg_{2.5}Si_2O_{8.25}$) allows speed of color fading to be slower (allows a capacity of retaining a color change to be higher) than a case where no additive is added and a case where iron (Fe) or europium (Eu) alone is added. In particular, the capacity of retaining a color change improved by nearly 10% as compared with the conventional case where iron (Fe) alone is added. That is, it has been revealed that addition of iron (Fe) and aluminum (Al) makes it possible to preserve a photochromism property of barium magnesium silicate for a longer period, i.e., makes it possible to obtain a photochromic substance having good durability.

Figure 2:
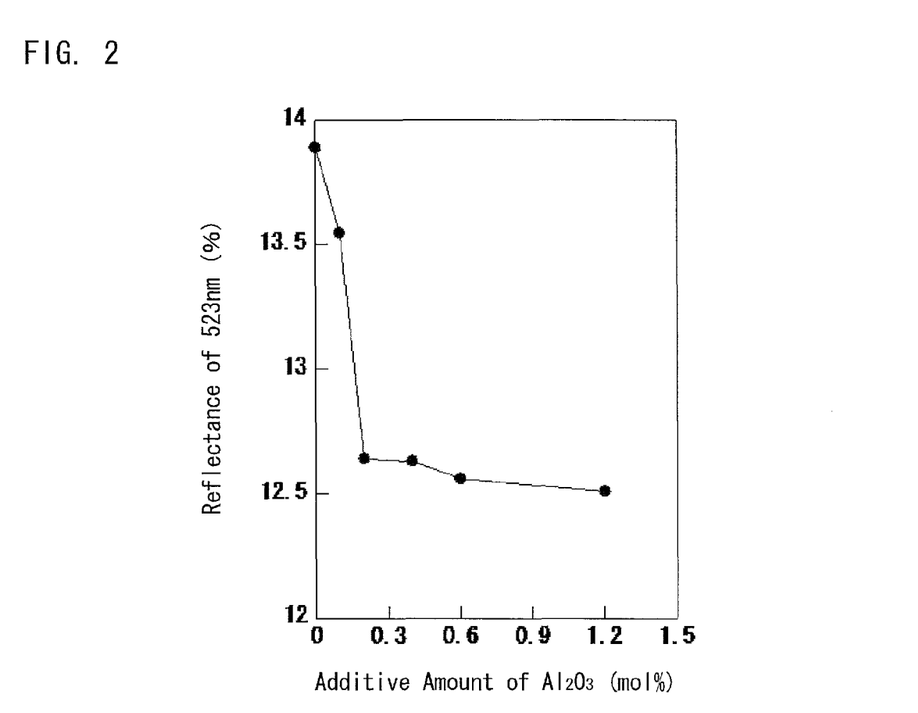
FIG. 2 is a graph, concerning the photochromic substance of the present invention, showing how photochromism properties of photochromic substances obtained by adding iron (Fe) and aluminum (Al) to barium magnesium silicate ($Ba_2Mg_{2.5}Si_2O_{8.25}$) are dependent on an amount of $Al_2O_3$ (amount of Al) added at the time of sample preparation.

FIG. 2 is a graph concerning the photochromic substance of the present invention, specifically, a graph showing how photochromism properties of the photochromic substances obtained by adding iron (Fe) and aluminum (Al) to barium magnesium silicate ($Ba_2Mg_{2.5}Si_2O_{8.25}$) are dependent on an amount of $Al_2O_3$ (amount of Al) added at the time of sample preparation. In the graph, the horizontal axis represents an additive amount (mol %) of Al to $Ba_2Mg_{2.5}Si_2O_{8.25}$, and the vertical axis represents reflectance (%) of light having a wavelength of 523 nm.

As is clear from FIG. 2, addition of 0.2 mol % or more of $Al_2O_3$ at the time of sample preparation makes it possible to suppress reflectance (%) of light having a wavelength of 523 nm as compared with a case where no additive is added. In particular, it has been revealed that addition of a certain amount of $Al_2O_3$ makes it possible to reduce the reflectance from approximately 13.9% to approximately 12.5%, as compared with the case where no additive is added. That is, barium magnesium silicate of the present invention to which certain amounts of iron and $Al_2O_3$ have been added is improved in deepness of a color change (reflectance), as compared with conventional barium magnesium silicate to which only iron (Fe) has been added. Accordingly, the barium magnesium silicate of the present invention has an improved photochromism property.

INDUSTRIAL APPLICABILITY

A photochromic substance of the present invention and a method of the present invention for producing the photochromic substance are applicable to various industrial products such as an optical disc (ultrahigh-density memory), an optical switch, optical printing ink, a display, sunglasses, and light control glass.

The invention claimed is:

1. A photochromic substance having a composition represented by the following formula (1'):

$$Ba_{(a-b)}Ca_bMg_cSi_dO_e:Fe_fM_g \qquad (1')$$

where $1.8 \leq a \leq 2.2$, $0 \leq b \leq 0.1$, $1.4 \leq c \leq 3.5$, $1.8 \leq d \leq 2.2$, $e=(a+c+2d)$, $0.0001 \leq f$, $0.0001 \leq g$, and M is 2. The photochromic substance according to claim 1, wherein in the formula (1') $0.001 \leq g \leq 0.012$.

3. A photochromic material comprising a photochromic substance as set forth in claim 1.

4. A method for producing a photochromic substance as set forth in claim 1, comprising the step of burning a mixture of (i) a raw material group including elements constituting the photochromic substance of claim 1 and (ii) boric acid.

5. The method according to claim 4, wherein the step of burning is carried out in a reductive atmosphere.

6. The method according to claim 5, wherein the step of burning is carried out in presence of a hydrogen gas.

* * * * *

UNITED STATES PATENT AND TRADEMARK OFFICE
CERTIFICATE OF CORRECTION

PATENT NO. : 9,663,398 B2
APPLICATION NO. : 14/368389
DATED : May 30, 2017
INVENTOR(S) : Morito Akiyama Page 1 of 1

It is certified that error appears in the above-identified patent and that said Letters Patent is hereby corrected as shown below:

On the Title Page

Item (73), the Assignee should read:
"Assignee: NATIONAL INSTITUTE OF ADVANCED INDUSTRIAL SCIENCE AND TECHNOLOGY, Tokyo (JP)"

In the Claims

Column 18, Claim 1, Line 17 should read:
"2d), $0.0001 \leq f$, $0.0001 \leq g$, and M is Al."

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*